United States Patent [19]
Suzuki et al.

[11] Patent Number: 5,448,553
[45] Date of Patent: Sep. 5, 1995

[54] PLASTIC HUB CONTAINING A MAGNETIC MATERIAL AND METHOD OF ITS MANUFACTURE

[75] Inventors: Naoyuki Suzuki; Mutsumasa Sasaki, both of Kawasaki, Japan

[73] Assignee: Mitsubishi Rayon Company Limited, Tokyo, Japan

[21] Appl. No.: 810,451

[22] Filed: Dec. 19, 1991

Related U.S. Application Data

[63] Continuation of Ser. No. 392,596, Aug. 11, 1989, abandoned.

[30] Foreign Application Priority Data

| Aug. 30, 1988 | [JP] | Japan | 63-215773 |
| Sep. 2, 1988 | [JP] | Japan | 63-219932 |
| Sep. 2, 1988 | [JP] | Japan | 63-219933 |
| Sep. 9, 1988 | [JP] | Japan | 63-226231 |
| May 2, 1989 | [JP] | Japan | 1-112934 |

[51] Int. Cl.$^6$ .................................. G11B 3/70
[52] U.S. Cl. .......................... 369/290; 369/291
[58] Field of Search ............ 369/291, 290, 270, 292; 360/135

[56] References Cited

U.S. PATENT DOCUMENTS

| 4,339,518 | 7/1982 | Okamura et al. | 430/110 X |
| 4,583,102 | 4/1986 | Tamura et al. | 346/135.1 |
| 4,688,127 | 8/1987 | Oishi et al. | 369/291 X |
| 4,877,667 | 10/1989 | Hattori et al. | 369/290 X |
| 4,885,653 | 12/1989 | Kato | 369/290 X |

FOREIGN PATENT DOCUMENTS

| 62-129985 | 6/1987 | Japan | 360/135 |
| 63-98853 | 4/1988 | Japan. | |
| 63-166048 | 7/1988 | Japan. | |
| 63-168887 | 7/1988 | Japan | 369/290 |
| 0187483 | 8/1988 | Japan | 369/270 |

*Primary Examiner*—Stuart S. Levy
*Assistant Examiner*—Allen Cao
*Attorney, Agent, or Firm*—Oblon, Spivak, McClelland, Maier & Neustadt

[57] ABSTRACT

An optical memory disk hub made essentially of from 7 to 55% by weight of a thermoplastic resin and from 45 to 93% by weight of magnetic powder and/or magnetic fiber.

19 Claims, 2 Drawing Sheets

PLASTIC HUB CONTAINING A MAGNETIC MATERIAL AND METHOD OF ITS MANUFACTURE

This application is a Continuation of application Ser. No. 07/392,596, filed on Aug. 11, 1989, now abandoned.

The present invention relates to an optical memory disk hub i.e. a hub to be attached to an optical memory disk for clamping by means of magnetic force.

In recent years, optical memory disks have been practically used as a large memory device for e.g. document files, educational materials or image treating files. Such optical memory disks are usually supplied in the form of a cartridge which comprises a casing and a hub-provided optical disk accomodated therein. The optical disk may comprise a recording material-coated substrate and a hub for magnet clamp attached to the side opposite to the recording surface side at the center portion of the substrate. Otherwise, the optical disk may comprise a pair of recording material-coated substrates bonded to each other with the recording surface sides located inside and in the absence or presence of a spacer interposed therebetween, wherein a hub for magnet clamp is attached to each side of the disk on the outside at the center portion of each substrate.

In such a case, the hub is usually made of a metal plate having a diameter of at most 40 mm and a thickness of at most 3 mm with a center hole, or of a thin metal plate having a diameter of at most 35 mm and a thickness of at most 1.5 mm attached to a thermoplastic resin by an adhesive or by integral injection molding. In order to prevent the optical memory disk from staining due to rusting, the metal is made of a non-rusting steel.

However, an optical memory disk having the above-mentioned metal hub attached thereto has a difficulty that the birefringence of the substrate tends to be very large, or in some cases, the substrate tends to undergo warpage, due to a slight change in the temperature or humidity because of the difference in the linear expansion coefficient or in the rigidity between the hub and the disk substrate made of a thermoplastic resin. The optical memory disk is designed so that a laser beam is irradiated through the substrate, and the reflection from the recording layer is read, whereby if the birefringence of the substrate is large, the bit error rate will be high, and it will be no longer useful for an optical memory disk. Further, the warpage or eccentricity of the disk tends to impart an excessive load for driving, and if it is substantial, the bit error rate will increase, such being undesirable.

On the other hand, in the case of a hub having a construction such that a metal plate is attached to a thermoplastic resin, the thermoplastic resin portion and the substrate will be bonded, whereby it is unnecessary to bond the metal plate and the substrate directly, and it is thereby possible to suppress the increase of the birefringence due to the change in the temperature or in the humidity. However, because of the difference in the linear expansion coefficient and in the rigidity between the thermoplastic resin and the metal plate, cracks or crazes are likely to appear at the bonded surface between the thermoplastic resin and the metal plate, or between the thermoplastic resin and the substrate, by a thermal cycle test or by a repeated loading test to a driving apparatus, or the metal plate tends to deform and its position relative to the magnet tends to be dislocated, whereby the adhesive force tends to vary, such being undesirable. Further, a metal that has the special properties has to be used to prevent formation of rust, and a step of bonding the thermoplastic resin and the metal plate is required. Thus, an increase of the costs is inevitable.

Thus, conventional methods are not satisfactory.

The present inventors have studied the material for the hub with an object to obtain an optical memory disk which has a minimum change in the birefringence by the attachment of the hub and which can be easily produced and undergoes little change due to the environmental change. As a result, it has been found possible to attain the object of the present invention by using a hub prepared by molding a composition comprising certain specific proportions of a magnetic material and a thermoplastic resin. The present invention has been accomplished on the basis of this discovery.

The present invention provides an optical memory disk hub made essentially of from 7 to 55% by weight of a thermoplastic resin and from 45 to 93% by weight of magnetic powder and/or magnetic fiber.

The optical memory disk hub of the present invention can readily be bonded to a disk substrate, whereby the birefringence of the disk substrate is not substantially increased, no substantial defects such as cracks will be formed at the bonded surface by the thermal cycle test, the assembly is sufficiently durable against the repeated loading test, there will be no formation of rust even under severe environmental conditions, and it is possible to minimize an increase of the bit error rate due to the attachment of the hub.

Now, the present invention will be described in detail with reference to the preferred embodiments.

Figure 1:
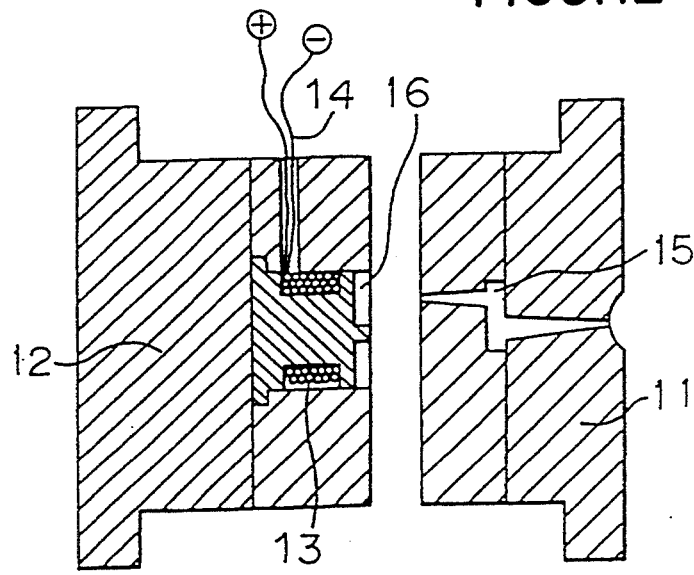
FIG. 1 is a cross sectional view illustrating one embodiment of the mold for injection molding to be employed in the present invention.
Figure 2:
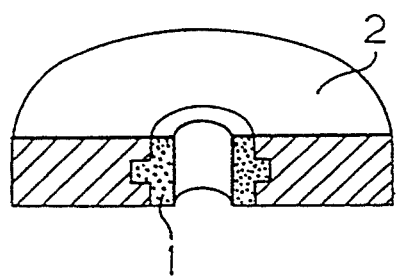
FIG. 2 is a cross sectional perspective view of one embodiment of the optical memory disk hub of the present invention.
Figure 3:
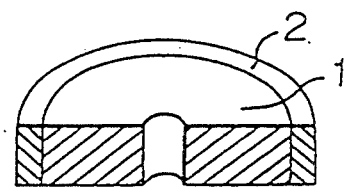
FIGS. 3 to 6 are cross sectional perspective views of other embodiments of the optical memory disk hub of the present invention.

The thermoplastic resin which may be used in the present invention includes, for example, a polyester resin, a polyamide resin, an ABS resin, a polycarbonate resin, a polyphenylene oxide resin, a polyacetal resin, a polyphenylene sulfide resin, a polysulfone resin, a polyether sulfone resin, a polyolefin resin and a polystyrene resin. Particularly preferred are a polyester resin, a polyamide resin, an ABS resin, a polycarbonate resin.

A hub prepared by using a polyester resin has an excellent glossy appearance and excellent sliding properties and is particularly excellent in the light resistance and the environmental resistance. For this purpose, a homopolyester or a copolyester prepared from monomers capable of forming a polyester, such as a dicarboxylic acid and a diol or hydroxy carboxylic acid, by a conventional method, is suitable. The dicarboxylic acid component may be an aliphatic dicarboxylic acid such as malonic acid, succinic acid, adipic acid, sebasic acid, an alicyclic dicarboxylic acid such as 1,3-cyclopentane dicarboxylic acid, 1,3-cyclohexane dicarboxylic acid or 1,4-cyclohexane dicarboxylic acid, an aromatic dicarboxylic acid such as terephthalic acid, isophthalic acid, 2,5-dibromoterephthalic acid, 2,6-naphthalene dicarboxylic acid or 4,4-sulfonediphenyldicarboxylic acid, and alkyl esters of these dicarboxylic acids. The diol component includes, for example, ethylene glycol, polyethylene glycol, polypropylene glycol, dipropylene glycol, 1,4-butanediol, 1,4-dihydroxyhexane and 1,4-dihydroxymethyl-cyclohexane. The hydroxycarboxylic acid includes, for example, p-hydroxymethyl-cyclohexane carboxylic acid and p-hydroxyphenylacetic acid.

Among such polyester resins, polyethylene terephthalate, polybutylene terephthalate and copolymers or blend compositions containing at least 50% by weight thereof, are particularly preferred.

As the polyamide resin, nylon 66, nylon 610, nylon 12 and copolymers or blend compositions thereof may be employed. However, nylon 6 and nylon 4 are hygroscopic and have drawbacks such that they tend to let magnetic fiber rust and they tend to undergo a dimensional change due to an environmental change. It is advisable to incorporate a polyphenylene sulfide to improve the dimensional stability and to overcome the hygroscopicity of the polyamide resin.

The ABS resin is an acrylonitrile-butadiene-styrene resin containing polybutadiene or a polybutadiene copolymer as the rubber component, and a commercially available product may usually be employed. With the ABS resin, the molding cycle is short, the molding temperature is low, and it is excellent in the dimensional stability, whereby the molding loss is little, the merit for the molding is substantial, and it is excellent in the adhesion to the disk substrate.

The polycarbonate resin is obtained by reacting a bisphenol with phosgene or with a carbonate precursor material such as a phosgene diaryl carbonate. The bisphenol includes, for example, bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxyphenyl)cyclopentane, 1,1-bis(4-hydroxyphenyl)cyclohexane and 4,4-dihydroxydiphenyl ether. Among these polycarbonate resins, a polycarbonate resin prepared from 2,2-bis(4-hydroxyphenyl)propane (so-called bisphenol A) is particularly preferred.

With the polycarbonate resin, there will be no substantial trouble during the molding, and the obtained hub will be excellent in the heat resistance, the dimensional stability, the environmental resistance and in the adhesiveness, and it is particularly suitable for a disk substrate made of a polycarbonate.

The polyolefin resin may be a resin obtained by polymerizing one or more of ethylene, propylene, butene-1, 4-methylbutene-1 and 4-methylepentene-1, or a polyolefin copolymer having an unsaturated carboxylic acid such as acrylic acid, methacrylic acid, maleic acid or fumaric acid, or an anhydride or an ester of such an acid, copolymerized or graft polymerized.

The polyolefin resin has excellent moisture resistance and suitable for a hub for the optical disk substrate made of a polyolefin.

The magnetic powder and magnetic fiber to be used in the present invention, is preferably made of a material having a low residual magnetic flux density and a large saturated magnetic flux density. Such material includes, for example, Fe of a purity of at least 98%, a Si-Fe alloy containing from 1 to 4% by weight of Si, an Al-Fe alloy containing from 10 to 16% by weight of Al, a Ni-Fe-Co alloy and an alloy containing at least 80% by weight of at least one of Fe, Ni and Co and containing Cr and Mn. Among them, a ferrite type stainless steel such as an alloy of SUS 400 series as stipulated in JIS, is preferably employed.

The magnetic powder preferably has a weight average particle size of from 0.5 to 300 μm. If the particle size exceeds 300 μm, the friction during the mixing with the thermoplastic resin or during the injection molding between the screw and the barrel tends to be large, whereby the screw or the barrel is likely to be damaged. On the other hand, if the particle size is less than 0.5 μm, the operation of mixing with the thermoplastic resin tends to be difficult, and the molded product hub thereby obtained will have a small residual magnetic flux density and a small permeability, such being undesirable. Within the above-mentioned range, particularly preferred is a range of from 5 to 150 μm.

The magnetic fiber preferably has an average fiber length of at most 10 mm. If the length is more than 10 mm, the friction during the mixing with the thermoplastic resin or during the injection molding between the screw and the barrel will be large, whereby the screw or the barrel is likely to be damaged. The fiber diameter is preferably from 0.002 to 0.2 mm. If the fiber diameter is less than 0.002, fiber aggregates are likely to form, whereby the operation of mixing with the thermoplastic resin tends to be difficult, and the molded product hub thereby obtained will have a small saturated magnetic flux density, such being undesribale. Within the above-mentioned range, a range of from 0.005 to 0.15 mm is particularly preferred.

Such fiber may be produced by a method wherein a metal mass is scraped by a vibrating blade, or a by a method wherein a metal is drawn to form a long fiber, which is then cut if necessary after being bonded.

The mixing proportions of the thermoplastic resin and the magnetic powder and magnetic fiber are determined in consideration of the desired magnetic properties and dependability of the optical memory disk hub to be obtained, the operational efficiency for extrusion and the production cost. The mixing proportion of the magnetic powder and magnetic fiber is usually from 45 to 93% by weight. If the proportion is less than 45% by weight, no adequate force for clamping the optical memory disk is obtainable. On the other hand, if the proportion exceeds 93% by weight, the operation efficiency for extrusion and the injection molding properties will substantially be impaired, and the mixing with the thermoplastic resin tends to be inadequate, whereby the strength tends to be small, and the product is susceptible to cracking with a relatively small shock, and the dependability will be lost.

The magnetic powder and the magnetic fiber may be used independently, but a better result can be obtained when they are used in combination. In such a case, it is preferred to combine from 1 to 92% by weight of the magnetic powder and from 1 to 60% by weight of the magnetic fiber from the viewpoint of the magnetic properties and the operational efficiency for extrusion.

The magnetic powder may be preliminarily treated with an epoxy-treating agent or a silane-type treating agent before mixing, to improve the outer appearance of the molded product or to improve the mechanical strength. However, the present invention can be practiced without using such a treating agent. Further, a coloring agent, an antioxidant or a releasing agent may be added at the time of the mixing, without bringing about any particular problem for the operation of the present invention.

On the other hand, reflecting the expansion of the application of the optical memory disk, a product which is durable for use under a severe condition such as a few 100,000 loading tests, is desired. As a result of extensive reasearch for developing a hub which is free from abrading the drive shaft even when repeatedly mounted on and dismounted from the driving apparatus and which is free from being abraded to form abraded powder or free from undergoing a demensional change, it has been found that an optical memory disk hub made essentially of from 7 to 55% by weight of a thermoplastic resin other than a polyolefin resin and a fluorine resin, and from 45 to 93% by weight of magnetic powder and/or magnetic fiber, and from 0.5 to 20% by weight, relative to the thermoplastic resin, of a polyolefin resin and/or a fluorine resin, is suitable.

The polyolefin resin to be used may be a resin obtained by polymerizing one or more of ethylene, propylene, butene-1 and 4-methylbutene-1, or a polyolefin copolymer obtained by copolymerizing or graft-polymerizing an unsaturated carboxylic acid such as acrylic acid, methacrylic acid, maleic acid or fumaric acid, or an anhydride or ester of such an acid. Among them, preferred is a polyethylene, and a low-density polyethylene or high density polyethylene may be employed.

As the fluorine resin, polytetrafluoroethylene or polychlorotrifluoroethylene may be employed. Particularly preferred is polytetrafluoroethylene.

The thermoplastic resin other than such polyolefin resin and fluorine resin, may be those as described above. Particularly preferred are polyester resin, a polyamide resin and a polycarbonate resin.

The mixing ratio of the polyolefin resin and the fluorine resin should not exceed 20% by weight relative to the thermoplastic resin other than the polyolefin resin and the fluorine resin. If the ratio exceeds 20% by weight, the operation efficiency for extrusion deteriorates, whereby the impact resistance of the hub thereby obtained tends to be low, and abrasion by the loading test tends to be high. It is particularly preferred to incorporate from 1 to 5% by weight of polyethylene and/or from 1 to 5% by weight of polytetrafluoroethylene.

As an apparatus for mixing the thermoplastic resin with the magnetic powder or magnetic fiber, a commonly employed apparatus such as a Henshel mixer, a mixing roll, a single screw extruder or a double screw extruder, may be employed. For the mixing, the thermoplastic resin is preferably supplied in the form of a powder having an average particle size of at most 1.5 mm to attain a particularly excellent mixing operation.

The molding of the hub can be conducted by a pressing method, but the molding cost will be thereby relatively high. Therefore, an injection molding method is recommended as a particularly suitable molding method. In the injection molding, preferred results with respect to the surface gloss or sink marks, will be obtained by setting the temperature at a level higher by from 10° to 20° C. than the molding temperature for the thermoplastic resin used as the starting material, or by setting the injection pressure at a level higher by from 50 to 100 kg/cm$^2$.

Further, the position, the number and the type of the gates are influential over the orientation direction of the magnetic fiber of the hub thereby obtained, whereby the linear expansion coefficient may sometimes be changed. Therefore, it is usually preferred to employ a multi pin gate or a submarine gate.

By conducting the molding in a magnetic field so that the powder during the molding is oriented in alignment with lines of magnetic induction, the present inventors have succeeded in reducing the linear expansion coefficient in the direction of the lines of magnetic induction and to increase the linear expansion coefficient in the direction perpendicular to the lines of magnetic induction. At the same time, it has been found that the orientation of the powder is likely to be influenced not only by the intensity of the magnetic field but also by the molding temperature, the injection pressure, etc. By controlling these conditions, it is possible to obtain a hub having excellent quality.

With the hub, the linear expansion coefficient in the thickness direction may be substantially different from the linear expansion coefficient of the substrate, but the linear expansion coefficient in the radial direction or in the circumferential direction has to be close to the linear expansion coefficient of the substrate. If the linear expansion coefficient in the radial direction is substantially different between the substrate and the hub, a distortion tends to form by e.g. heat cycle, which adversely affects the signal surface, or peeling or cracking is likely to result at the bonded surface. Accordingly, it is necessary to apply the lines of magnetic induction in the direction of the thickness of the hub.

Namely, injection molding is conducted under such conditions that by using a mold having a solenoid coil incorporated therein, a magnetic field is formed by conducting electricity so that lines of magnetic induction pass through the mold cavity, whereby the magnetic powder is aligned in the direction of the lines of magnetic induction. The same effects are obtainable when a permanet magnet is employed instead of the solenoid coil.

At the time of such injection molding, the magnetic field may be switched on and off in synchronization with the injection cycle, whereby a hub with the magnetic powder better aligned having little distortion can be obtained. The magnetic field is preferably switched on immediately prior to the completion of the filling and switched off during the cooling process.

Further, the present inventors have conducted extensive researches to produce a hub which is free from abrading the driving shaft even by a repeated loading test and which is free from producing abraded powder even when abraded and free from a dimensional change, and as a result, have found it possible to obtain a good result with an optical memory disk hub consisting essentially of an inner circumferential part and an outer circumferential part surrounding the inner circumferential part, wherein at least the inner circumference of the center hole of the hub is made of from 60 to 99% by weight of at least one member selected from the group consisting of a polyester resin, a polyamide resin and a polyacetal resin and from 40 to 1% by weight of at least one member selected from the group consisting of a polyolefin and a fluorine resin, and the outer circumferential part is made of from 7 to 551% by weight of a thermoplastic resin and from 45 to 93% by weight of magnetic powder and/or magnetic fiber.

Here, as the polyamide resin, nylon 66, nylon 610, nylon 12, or a copolymer or a blend composition thereof may be employed.

As the polyacetal resin, either a so-called homopolymer which is a polymer of formaldehyde, or a so-called copolymer obtained by copolymerizing a small amount of ethyleneoxide to trioxane, may be employed.

The inner circumferential part may be molded by a commonly employed injection molding machine. As the requirement for the dimensional precision is severe, it is advisable to maintain the mold temperature, the injection pressure and the temperature and humidity of the molding atmosphere at constant levels.

The inner circumferential part thus obtained is inserted in a mold, and a mixture of the magnetic material and the thermoplastic resin is injection-molded along the outer pheriphery thereof.

Molded products can be obtained at a high productivity by using a so-called two color molding machine which has two cylinders and which is capable of continuously molding the inner circumferential part and the outer circumferential part in one cycle. In this case, the dimension of the inner diameter is likely to be changed, and it is important to maintain the molding conditions at constant levels.

As a method for bonding the hub, it is preferred to employ a bonding method by ultraviolet irradiation so that the bonding can be completed in a short period of time without causing a distortion to the optical disk substrate. However, the hub made of the above-mentioned magnetic material-containing thermoplastic resin is opaque, and it is thereby difficult to conduct the bonding by means of an ultraviolet curable adhesive. As a result of extensive researches to develop a hub which can readily be bonded by ultraviolet irradiation, it has been found possible to solve this problem by using an optical memory disk hub consisting essentially of an inner circumferential part and an outer circumferential part enclosing the inner circumferential part, wherein the inner circumferential part is made of from 7 to 55% by weight of a thermoplastic resin and from 45 to 93% by weight of magnetic powder and/or magnetic fiber, and the outer circumferential part is made of a transparent resin.

As the transparent resin constituting the outer circumferential part, a polyester resin, a polycarbonate resin, an impact resistant polystyrene resin, a transparent ABS, an impact resistant acrylate resin, a polymethylpentene resin or a transparent nylon resin may be employed.

Figure 4:
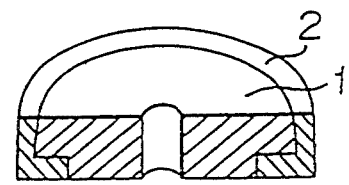
Figure 5:
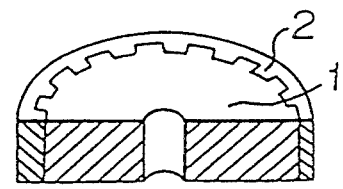
Figure 6:
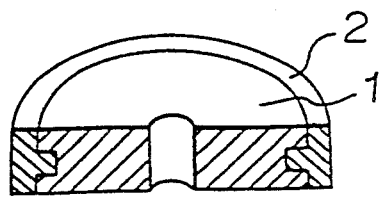

The structure of the outer circumferential portion may preferably be, for example, as illustrated in FIGS. 3 to 6, from the viewpoint of the bonding efficiency by ultraviolet irradiation. Among them, the structure illustrated in FIG. 4 is particularly preferred. In these Figures, reference numeral 1 indicates the inner circumferential part, and numeral 2 indicates the outer circumferential part.

As a method for molding the optical memory disk hub of the present invention, there may be employed a method wherein firstly the inner circumferential part is molded by injection molding the magnetic material-containing thermoplastic resin composition, then inserting the obtained inner circumferential part in a mold, and injection molding a transparent resin to the outer periphery thereof, or a method wherein firstly the outer circumferential part is injection-molded, followed by molding the inner circumferential part. The hub can be produced at a low molding cost by using a so-called two-color molding machine which has two cylinders and which is capable of molding the inner circumferential part and the outer circumferential part in one cycle.

Figure 7:
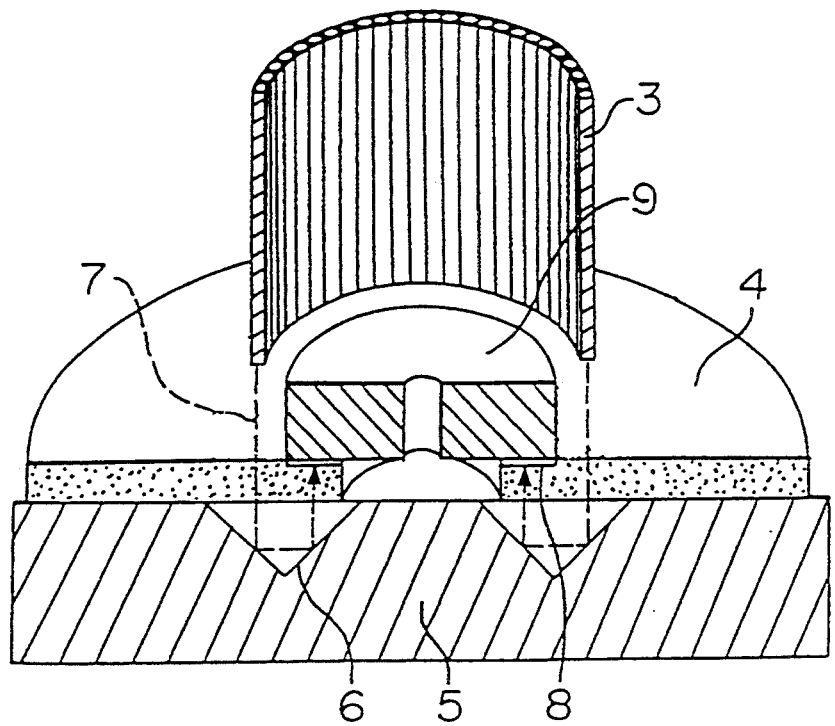
FIG. 7 illustrates a manner of bonding the optical memory disk hub of the present invention to a substrate.

The bonding of the hub to the optical memory disk substrate can be conducted by means of a pressure sensitive adhesive double coated tape, or by coating an ultraviolet curable adhesive such as an epoxy-type adhesive to the hub or to the substrate by means of a usual dispenser, adjusting the relative positions, followed by bonding. As the bonding method, it is preferred to irradiate ultraviolet rays outside the periphery or through the transparent outer circumferential part of each hub from both sides to which hubs are attached, so that the ultraviolet rays are reflected to reach the adhesive layer. An emobidment of this case will be described with reference to FIG. 7.

Ultraviolet rays 7 are led by e.g. optical fibers 3 in a ring shape so that they are reflected by the reflection surface 6, whereby the bonding can effectively be conducted by irradiation. In this case, good results are obtainable when the ultraviolet rays 7 irradiated in a ring form from the forward ends of the optical fibers 3 are aligned in the direction slightly inwardly of the hub 9.

For reflecting the ultraviolet rays 7, it is possible to employ a jig 5 having a reflection surface 6 shaped so that ultraviolet rays 7 are effectively focused at the bonding surface 8. Reference numeral 4 indicates a disk substrate.

Now, the present invention will be described in further detail with reference to Examples. However, it should be understood that the present invention is by no means restricted by such specific Examples. In the Examples, the evaluation of the hub and the optical memory disk was made in accordance with the following methods.

(1) Evaluation of the hub
 (i) Salt water test:
 In accordance with the method of JIS Z-2371, the salt water spray test was conducted for 48 hours, and the formation of rust on the hub surface was observed.
 (ii) Environmental resistance test:
 The hub was left to stand at 60° C. under a relative humidity of 90% for two weeks, whereupon formation of rust on the hub surface was observed.
 (iii) Dimensional change:
 The environmental temperature was raised from −20° C. to 55° C., whereupon an average dimensional change rate (%/°C.) of the outer diameter of the hub was measured.
 (iv) Heat cycle test:
 The hub was held at −30° C. for 6 hours, and then it was gradually heated to 60° C. over a period of 6 hours, then maintained for 6 hours at 60° C. Then, the temperature was gradually lowered to −30° C. over a period of 6 hours. This heat cycle was repeated 30 times, and the change of the hub was observed.

(2) Evaluation of the optical memory disk
 (i) Birefringence:
 The birefringence of an optical memory disk with a diameter of 60 mm was measured at a wavelength of 830 nm before and after the attachment of the hub and before and after ten cycles of the thermal cycle test, each cycle consisting a temperature change from −30° C. to 60° C. in a relative humidity of 90% for 24 hours.
 (ii) Loading test:
 Loading to a record-reproducing drive apparatus was repeated 5,000 times, whereupon the outer appearance of the disk was inspected.
 (iii) Clamping force:

The clamping force (g) was measured as the force required to pull off in an axial direction an optical memory disk clamped to the drive apparatus.

(iv) Bonding strength of the hub:

The bonding strength required to peel the hub off the optical memory disk was measured.

EXAMPLE 1

A polybutylene terephthalate (PBT) powder (Tufpet N-1000, manufactured by Mitsubishi Rayon Co., Ltd.) having an average particle size of 0.4 mm and an intrinsic viscosity of 0.85 as measured in a 50/50 solution of phenol and tetrachloroethane and a magnetic fiber having an average fiber diameter of 0.03 mm and an average fiber length of 2 mm, were mixed in the proportions as identified in Table 1. Further, based on the amount of the thermoplastic resin powder, 0.3% by weight of carbon black as a coloring agent, 0.2% by weight of an antioxidant (B-220, manufactured by Ciba-Gaigy Company) and 0.2% by weight of a releasing agent (OP-WAX, manufactured by Hoechst Company) were added thereto. The mixture was stirred and mixed in a V-type tumbler for 30 minutes at 30 rpm, and then extruded by a vent-type single screw extruder having a darmage-equipped screw having a diameter of 45 mm. The obtained strand was cut to obtain pellets of a magnetic material-incorporated thermoplastic resin. Such pellets were injection-molded by means of an injection molding machine having an injection capacity of 1 ounce at a cylinder temperature of 250° C. at a mold temperature of 50° C. under an injection maximum pressure of 500 kg/cm² at a molding cycle of 22 seconds to obtain a molded product of a hub having a disk shape with a thickness of 2.15 mm and provided at its center a tetragonal hole with a diameter of 4.00 mm.

This hub was bonded by an epoxy-type adhesive to a separately molded and groove-recorded polycarbonate disk substrate coated with a cyanine dye recording material and having an outer diameter of 130 mm, an inner diameter of 15 mm and a thickness of 1.2 mm. Then, two sheets of this hub-attached disk substrate were bonded to each other by an adhesive with the recording surfaces located inside and with thin polycarbonate plates having a thickness of 0.6 mm interposed along the outer most periphery and the inner most periphery to obtain an optical memory disk having a sandwich structure. The results of evaluation are shown in Table 1.

EXAMPLES 2 TO 7 AND COMPARATIVE EXAMPLE 1

The experiments were conducted in the same manner as in Example 1 except that the type, the average fiber diameter and the average fiber length of the magnetic fiber and the mixing proportion with the thermoplastic resin were changed as shown in Table 1. The results of evaluation are shown in Table 1.

TABLE 1

| | Magnetic fiber | | | Weight ratio of thermoplastic resin/ magnetic fiber | Evaluation of hub | | | Evaluation of optical memory disk | | |
|---|---|---|---|---|---|---|---|---|---|---|
| | | | | | | | | | Birefringence (double pass, nm) | |
| | Type | Average fiber diameter (mm) | Average fiber length (mm) | | Salt water test | Environmental resistance test | Dimensional change (%/°C.) | Blank | After attaching the hub | After thermal cycle test |
| Example 1 | SUS 430 | 0.03 | 2.0 | 30/70 | No change | No change | $5.1 \times 10^{-3}$ | 20 | 20 | 20 |
| Example 2 | SUS 430 | 0.1 | 1.5 | 30/70 | No change | No change | $5.2 \times 10^{-3}$ | 19 | 20 | 19 |
| Example 3 | SUS 430 | 0.01 | 1.5 | 30/70 | No change | No change | $5.0 \times 10^{-3}$ | 20 | 20 | 18 |
| Example 4 | SUS 430 | 0.03 | 6 | 30/70 | No change | No change | $4.8 \times 10^{-3}$ | 21 | 22 | 20 |
| Example 5 | SUS 430 | 0.03 | 1.5 | 40/60 | No change | No change | $5.8 \times 10^{-3}$ | 20 | 20 | 19 |
| Example 6 | SUS 430 | 0.03 | 1.5 | 20/80 | No change | No change | $4.2 \times 10^{-3}$ | 19 | 20 | 19 |
| Example 7 | 99.9% Fe | 0.03 | 1.5 | 30/70 | No change | No change | $4.9 \times 10^{-3}$ | 20 | 20 | 19 |
| Comparative Example 1 | SUS 430 | 0.03 | 2.0 | 60/40 | No change | No change | $6.2 \times 10^{-3}$ | 20 | 20 | 19 |

| | Evaluation of optical memory disk | | | | |
|---|---|---|---|---|---|
| | Loading test | Clamping force (g) | Bonding strength of hub (kg) | Bit error rate | Notes (Evaluation result) |
| Example 1 | No change | 750 | 19 | $10^{-6}$ | Good |
| Example 2 | No change | 780 | 19 | $10^{-6}$ | Good |
| Example 3 | No change | 700 | 19 | $10^{-6}$ | Good |
| Example 4 | No change | 730 | 19 | $10^{-6}$ | Good |
| Example 5 | No change | 530 | 19 | $10^{-6}$ | Good |
| Example 6 | No change | 1100 | 19 | $10^{-6}$ | Good |
| Example 7 | No change | 950 | 19 | $10^{-6}$ | Good |
| Comparative Example 1 | No change | 300 | 19 | $10^{-6}$ | Clamping force being inadequate |

EXAMPLE 8

25 parts by weight of a polycarbonate resin powder having an average molecular weight of 25,000 and an average particle size of 0.3 mm and 75 parts by weight of SUS 430 fiber produced by a bibili vibration method and having an average fiber diameter of 0.03 mm and an average fiber length of 1.5 mm, were mixed and processed in the same manner as in Example 1 to obtain pellets of a magnetic material-incorporated polycarbonate resin. The pellets were injection-molded by means of a 1 ounce injection molding machine at a cylinder temperature of 280° C. at a mold temperature of 50° C. under an injection maximum pressure of 650 kg/cm$^2$ at a molding cycle of 25 seconds to obtain a disk shaped molded product of a hub having an outer diameter of 25.00 mm, an inner diameter of 4.006 mm and a thickness of 2.03 mm and having small projections provided concentrically at two locations of diameters of 24 mm and 20 mm for ultrasonic bonding. This hub was bonded to the same disk substrate as used in Example 1 by a supersonic bonding method. In the same manner as in Example 1, an optical memory disk of sandwich structure comprising two sheets of such a hub-attached disk substrate, was prepared and evaluated in the same manner. The results were excellent as shown in Table 2.

EXAMPLE 9

10 parts by weight of a polyphenylene sulfide powder having an average particle size of 0.05 mm, 15 parts by weight of a nylon 66 powder having an average particle size of 0.1 mm and 75 parts by weight of SUS 430 fiber having an average fiber diameter of 0.03 mm and an average fiber length of 1.5 mm, were mixed and processed in the same manner as in Example 1 to obtain pellets of a magnetic material-incorporated resin. The pellets were injection molded by means of a 1 ounce injection molding machine at a cylinder temperature of 30° C. at a mold temperature of 80° C. under an injection maximum pressure of 600 kg/cm$^2$ at a molding cycle of 25 seconds to obtain a disk-shaped molded product of a hub having an outer diameter of 25.03 mm, an inner diameter of 4.004 mm and a thickness of 2.01 mm. In the same manner as in Example 1, the disk substrate and the hub were bonded, and an optical memory disk of a sandwich structure comprising two sheets of the hub-attached disk substrate was prepared and evaluated in the same manner. The results were excellent as shown in Table 2.

EXAMPLE 10

13 parts by weight of a polybutylene terephthalate powder having an average diameter of 0.4 mm, 15 parts by weight of a polycarbonate powder having an average particle size of 0.3 mm and 72 parts by weight of Fe fiber having a purity of 99.8% prepared by a drawing method and having an average fiber diameter of 0.03 mm and an average fiber length of 1.5 mm, were thoroughly mixed and processed in the same manner as in Example 1 to obtain pellets of a magnetic material-incorporated thermoplastic resin. The pellets were injection-molded by means of a 1 ounce injection molding machine at a cylinder temperature of 280° C. at a mold temperature of 60° C. under an injection maximum pressure of 700 kg/cm$^2$ at a molding cycle of 23 seconds to obtain a disk-shaped molded product of a hub having an outer diameter of 25.04 mm, an inner diameter of 4.005 mm and a thickness of 2.02 mm and having three small projections provided concentrically at three locations of diameters of 24 mm, 20 mm and 16 mm for supersonic bonding. In the same manner as in Example 2, the disk substrate and the hub were supersonically bonded, and an optical memory disk of a sandwich structure comprising two sheets of the hub-attached disk substrate, was prepared and evaluated in the same manner. The results were excellent as shown in Table 2.

EXAMPLE 11

10 parts by weight of a polyethylene terephthalate powder having an average particle size of 0.3 mm, 18 parts by weight of a polybutylene terephthalate powder having an average particle size of 0.25 mm and 72 parts by weight of SUS 429 fiber having an average fiber diameter of 0.3 mm and an average fiber length of 1.5 mm, were mixed. Further, the same antioxidant, releasing agent and carbon black as used in Example 1 were added each in an amount of 0.1% by weight relative to the amount of the thermoplastic resin powder. The resin mixture was thoroughly mixed and processed in the same manner as in Example 1 to obtain pellets of a magnetic material-incorporated polyester resin. The pellets were injection-molded by means of a 1 ounce injection molding machine at a cylinder temperature of 250° C. at a mold temperature of 50° C. under an injection maximum pressure of 450 kg/cm$^2$ at a molding cycle of 18 seconds to obtain a disk-shaped molded product of a hub having an outer diameter of 24.98 mm, an inner diameter of 4.001 mm and a thickness of 2.00 mm. In the same manner as in Example 1, the disk substrate and the hub were bonded, and an optical disk of a sandwich structure comprising two sheets of such a hub-attached disk substrate, was prepared and evaluated in the same manner. The results were excellent as shown in Table 2.

TABLE 2

| | Evaluation of hub | | | Evaluation of optical memory disk | | | | | | | |
|---|---|---|---|---|---|---|---|---|---|---|---|
| | | | | | Birefringence (double pass, nm) | | | | Bonding | | |
| | Salt water test | Environmental resistance test | Dimensional change (%/°C.) | Blank | After attaching the hub | After thermal cycle test | Loading test | Clamping force (g) | strength of hub (kg) | Bit error rate | Notes (Evaluation result) |
| Example 8 | No change | No change | 4.6 × 10$^{-3}$ | 20 | 20 | 18 | No change | 890 | 18 | 10$^{-6}$ | Good |
| Example 9 | No change | No change | 4.7 × 10$^{-3}$ | 19 | 19 | 18 | No change | 900 | 19 | 10$^{-6}$ | Good |
| Example 10 | No change | No change | 4.9 × 10$^{-3}$ | 18 | 18 | 18 | No change | 800 | 20 | 10$^{-6}$ | Good |
| Example 11 | No change | No change | 4.9 × 10$^{-3}$ | 19 | 20 | 18 | No change | 800 | 18 | 10$^{-6}$ | Good |

EXAMPLES 12 TO 16 AND COMPARATIVE EXAMPLES 2 TO 4

A polybutylene terephthalate resin (Tufpet N-1000, manufactured by Mitsubishi Rayon Co., Ltd.) pulverized to an average particle size of 0.5 mm, SUS-430 powder and SUS-430 fiber were mixed in the proportions as identified in Table 1. Further, based on the weight of the pulverized PBT, 0.2% by weight of carbon black as a coloring agent, 0.2% by weight of an antioxidant (B-220, manufactured by Ciba-Gaigy Company) and 0.2% by weight of a releasing agent (OP-MAX, manufactured by Hoechst Company) were added thereto. The mixture was stirred in a V-type tumbler for 30 minutes at 30 rpm and then extruded by a vent-type single screw extruder having a darmage-equipped screw having a diameter of 45 mm. The strand thereby obtained was cut to obtain pellets of a magnetic material-incorporated thermoplastic resin. The pellets were injection-molded by an injection molding machine provided with a single-cavity mold for a hub, having a three point pin gate, and having a mold clamping force of 5 ton, at a cylinder temperature of 260° C. at a mold temperature of 85° C. under an injection maximum pressure of 500 kg/cm² at a molding cycle of 13 seconds to obtain a hub having an outer diameter of 25 mm, a thickness of 2.18 mm and a center hole diameter of 4 mm. The hub thus obtained was bonded by means of an adhesive to the center portion of a separately molded polycarbonate optical memory disk substrate having an outer diameter of 130 mm, an inner diameter of 15 mm and a thickness of 1.2 mm on the side opposite to the recording surface. Then, two sheets of such a hub-attached disk substrate were bonded to each other with an adhesive with the recording surfaces located inside and with thin polycarbonate plates having a thickness of 0.5 mm interposed therebetween along the outermost periphery and the innermost periphery, to obtain an optical memory disk having a sandwich structure. The results of evaluation are shown in Table 3.

TABLE 3

| | Hub composition | | | | | | Thermal cycle test | Dimensional change of outer diameter of hub (%/°C.) | Birefringence (double pass, nm) | | |
| | PBT amount (parts) | SUS-powder | | SUS-fiber | | | | | | | |
| | | Particle size (mm) | Amount (parts) | Fiber diameter (mm) | Fiber length (mm) | Amount (parts) | | | Blank | After attaching the hub | After thermal cycle test |
| --- | --- | --- | --- | --- | --- | --- | --- | --- | --- | --- | --- |
| Example 12 | 20 | 0.07 | 78 | 0.015 | 2 | 2 | No change | $4.9 \times 10^{-3}$ | 20 | 21 | 21 |
| Example 13 | 20 | 0.1 | 70 | 0.02 | 3 | 10 | No change | $4.8 \times 10^{-3}$ | 20 | 20 | 21 |
| Example 14 | 15 | 0.07 | 83.5 | 0.015 | 2 | 1.5 | No change | $4.0 \times 10^{-3}$ | 20 | 20 | 23 |
| Example 15 | 35 | 0.2 | 20 | 0.02 | 8 | 45 | No change | $5.9 \times 10^{-3}$ | 20 | 21 | 21 |
| Example 16 | 40 | 0.25 | 10 | 0.04 | 6 | 50 | No change | $6.1 \times 10^{-3}$ | 20 | 21 | 21 |
| Comparative Example 2 | 6.5 | 0.05 | 90 | 0.02 | 2 | 3.5 | No change | — | — | — | — |
| Comparative Example 3 | 56 | 0.1 | 2 | 0.03 | 3 | 42 | No change | $6.4 \times 10^{-3}$ | 20 | 20 | 21 |

| | Loading test | Clamping force (g) | Bonding strength of hub (kg) | Notes (Evaluation result) |
| --- | --- | --- | --- | --- |
| Example 12 | No change | 900 | 18 | Good |
| Example 13 | No change | 930 | 18 | Good |
| Example 14 | No change | 1200 | 18 | Good |
| Example 15 | No change | 700 | 19 | Good |
| Example 16 | No change | 640 | 19 | Good |
| Comparative Example 2 | No change | — | — | Poor flowability Not moldable |
| Comparative Example 3 | No change | 300 | 19 | Clamping force being inadequate |

COMPARATIVE EXAMPLE 5

By using a hub made of SUS-430 having an outer diameter of 25 mm, a thickness of 2.18 mm and a center hole diameter of 4 mm, evaluation was conducted in the same manner as in Example 1. The results are shown in Table 4.

COMPARATIVE EXAMPLE 6

By using a hub made of polycarbonate having an outer diameter of 25 mm and a thickness of 2.18 mm having a SUS-430 plate having an outer diameter of 21 mm, a thickness of 0.5 mm and a center hole diameter of 4 mm inserted, evaluation was conducted in the same manner as in Example 12. The results are shown in Table 4.

TABLE 4

| | Thermal cycle test | Dimensional change of outer diameter of hub (%/°C.) | Birefringence (double pass, nm) | | | Loading test | Clamping force (g) | Bonding strength of hub (kg) | Notes (Evaluation result) |
| | | | Blank | After attaching the hub | After thermal cycle test | | | | |
| --- | --- | --- | --- | --- | --- | --- | --- | --- | --- |
| Comparative Example 5 | No change | $1.1 \times 10^{-3}$ | 20 | 35 | 30 | No change | 1800 | 15 | Birefringence increased by bonding |
| Comparative Example 6 | Cracks observed in poly- | $5.0 \times 10^{-3}$ | 20 | 21 | 21 | No change | 900 | 21 | Cracks observed by thermal |

TABLE 4-continued

| Thermal cycle test | Dimensional change of outer diameter of hub (%/°C.) | Birefringence (double pass, nm) | | Loading test | Clamping force (g) | Bonding strength of hub (kg) | Notes (Evaluation result) |
|---|---|---|---|---|---|---|---|
| | | Blank | After attaching the hub | After thermal cycle test | | | |
| carbonate | | | | | | | cycle test |

EXAMPLES 17 TO 21 AND COMPARATIVE EXAMPLES 7 AND 8

A magnetic powder having an average particle size of 100 μm and a polycarbonate resin (Nobalex 7022 PJ, manufactured by Mitsubishi Kasei Corporation) pulverized to an average particle size of 0.3 μm, were mixed in the proportions as identified in Table 1. Further, based on the weight of the thermoplastic resin powder, 0.4% by weight of carbon black as a coloring agent, 0.2% by weight of an antioxidant (B-220, manufactured by Ciba-Gaigy Company) and 0.2% by weight of a releasing agent (OP-WAX, manufactured by Hoechst Company) were added thereto. The mixture was stirred in a V-type tumbler for 30 minutes at 30 rpm and then extruded by a vent-type single screw extruder having a darmage-equipped screw having a diameter of 45 mm. The strand thereby obtained was cut to obtain pellets of a magnetic material-incorporated thermoplastic resin. The pellets were injection molded by an injection molding machine having an injection capacity of 1 ounce and provided with a single-cavity mold with a one point pin gate with a solenoid coil disposed in a movable plate as shown in FIG. 1 so that lines of magnetic induction traverse the mold cavity, at a cylinder temperature of 295° C. at a mold temperature of 50° C. under an injection maximum pressure of 500 kg/cm² and at a molding cycle of 19 seconds to obtain a hub having a disk-shape with an outer diameter of 25 mm and a thickness of 2.15 mm and provided at its center with a hole having a diameter of 4 mm. One second after the initiation of the injection, a direct voltage and current as identified in Table 1 were applied to the solenoid coil to let a magnetic field form. 13 seconds after the injection, the application was switched off.

The hub thereby obtained was bonded by means of an epoxy-type adhesive to a separately molded and groove-recorded polycarbonate substrate with a cyanine dye recording material coated thereon and having an outer diameter of 130 mm, an inner diameter of 15 mm and a thickness of 1.2 mm. Then, two sheets of such a hub-attached disk substrate were bonded to each other by means of an adhesive with thin polycarbonate plates having a thickness of 0.6 mm interposed along the outermost periphery and the innermost periphery to obtain an optical memory disk having a sandwich structure. The results of evaluation are shown in Table 5.

TABLE 5

| | Type of Magnetic fiber | Weight ratio of thermoplastic resin/ magnetic fiber | Current and voltage applied during injection molding | | Evaluation of hub | | | Evaluation of optical memory disk | | |
|---|---|---|---|---|---|---|---|---|---|---|
| | | | Voltage (V) | Current (A) | Salt water test | Dimensional change (%/°C.) | | Birefringence (double pass, nm) | | |
| | | | | | | Radial direction | Thickness direction | Blank | After attaching the hub | After thermal cycle test |
| Example 17 | SUS 430 | 40/60 | 20 | 1 | No change | $6.22 \times 10^{-3}$ | $5.8 \times 10^{-3}$ | 20 | 21 | 21 |
| Example 18 | SUS 430 | 20/80 | 20 | 1 | No change | $5.5 \times 10^{-3}$ | $4.9 \times 10^{-3}$ | 20 | 20 | 21 |
| Example 19 | 99.9% Fe | 40/60 | 20 | 1 | No change | $6.3 \times 10^{-3}$ | $5.7 \times 10^{-3}$ | 20 | 20 | 21 |
| Example 20 | 99.9% Fe | 20/80 | 20 | 1 | No change | $5.7 \times 10^{-3}$ | $4.8 \times 10^{-3}$ | 20 | 21 | 20 |
| Example 21 | SUS 429 | 20/80 | 20 | 1 | No change | $5.5 \times 10^{-3}$ | $4.9 \times 10^{-3}$ | 20 | 21 | 21 |
| Comparative Example 7 | SUS 430 | 65/35 | 20 | 1 | No change | $7.0 \times 10^{-3}$ | $6.5 \times 10^{-3}$ | 20 | 21 | 21 |
| Comparative Example 8 | SUS 430 | 6/94 | — | — | — | — | — | — | — | — |

| | Evaluation of optical memory disk | | | |
|---|---|---|---|---|
| | Loading test | Clamping force (g) | Bonding strength of hub (kg) | Notes (Evaluation result) |
| Example 17 | No change | 650 | 23 | Good |
| Example 18 | No change | 990 | 21 | Good |
| Example 19 | No change | 820 | 23 | Good |
| Example 20 | No change | 1600 | 21 | Good |
| Example 21 | No change | 950 | 21 | Good |

TABLE 5-continued

|   |   |   |   |   |   |
|---|---|---|---|---|---|
|   | Comparative Example 7 | No change | 360 | 23 | Clamping force being inadequate |
|   | Comparative Example 8 | — | — | — | Poor moldability, No molded product obtained |

EXAMPLE 22

A polybutylene terephthalate powder having an average particle size of 0.4 mm and an intrinsic viscosity of 0.85 as measured in a 50/50 solution of phenol and tetrachloroethane and a magnetic fiber having an average fiber diameter of 0.02 mm and an average fiber length of 1.5 mm, were mixed in the proportions as identified in Table 6. Further, based on the amount of the thermoplastic resin, 0.3% by weight of carbon black as a coloring agent, 0.2% by weight of an antioxidant (B-200, manufactured by Ciba-Gaigy Company), 0.2% by weight of a releasing agent (OP-WAX, manufactured by Hoechst Company) were added thereto. The mixture was stirred and mixed in a V-tumbler for 30 minutes at 30 rpm and then extruded by a vent-type single screw extruder having a darmageequipped screw having a diameter of 45 mm. The strand thereby obtained was cut to obtain pellets of a magnetic filler-incorporated thermoplastic resin. These pellets were injection-molded by an injection molding machine having an injection capacity of 1 ounce and provided with a single cavity mold with a three point pin gate having a solenoid coil disposed in a movable plate so that lines of magnetic induction traverse the mold cavity, at a cylinder temperature of 250° C. at a mold temperature of 50° C. under an injection maximum pressure of 500 kg/cm$^2$ at a molding cycle of 22 seconds to obtain a molded product of a hub having a disk shape with an outer diameter of 25.00 mm and a thickness of 2.15 mm and provided at its center with a tetragonal hole with each side being 4.00 mm.

One second after the initiation of the injection, the direct current voltage and current as identified in Table 6 were applied to the solenoid coil to let a magnetic field form, and 13 seconds after the injection, the application was switched off.

The hub thereby obtained was bonded by means of an epoxy-type adhesive to a separately molded and groove-recorded polycarbonate disk substrate having an outer diameter of 130 mm, an inner diameter of 15 mm and a thickness of 1.2 mm and having a cyanine dye recording material coated thereon. Then, two sheets of this hub-attached disk substrate were bonded to each other by an adhesive with the recording surfaces located inside and with thin polycarbonate plates having a thickness of 0.6 mm interposed along the outermost periphery and the innermost periphery to obtain an optical memory disk having a sandwich structure. The results of evaluation are shown in Table 6.

EXAMPLES 23 TO 26 AND COMPARATIVE EXAMPLE 9

The experiments were conducted in the same manner as in Example 22 except that the type of the magnetic fiber and the mixing ratio (weight ratio) of the thermoplastic resin to the magnetic fiber were changed as shown in Table 6. The results are shown in Table 6.

TABLE 6

|  | Type of Magnetic fiber | Weight ratio of thermoplastic resin/ magnetic fiber | Current and voltage applied during injection molding | | Evaluation of hub | | | Evaluation of optical memory disk | | |
|---|---|---|---|---|---|---|---|---|---|---|
|  |  |  | Voltage (V) | Current (A) | Salt water test | Dimensional change (%/°C.) | | Birefringence (double pass, nm) | | |
|  |  |  |  |  |  | Radial direction | Thickness direction | Blank | After attaching the hub | After thermal cycle test |
| Example 22 | SUS 430 | 35/65 | 20 | 0.2 | No change | $6.5 \times 10^{-3}$ | $4.7 \times 10^{-3}$ | 20 | 20 | 20 |
| Example 23 | SUS 430 | 40/60 | 20 | 0.2 | No change | $6.8 \times 10^{-3}$ | $5.5 \times 10^{-3}$ | 20 | 20 | 19 |
| Example 24 | 99.9% Fe | 35/65 | 20 | 0.2 | No change | $6.5 \times 10^{-3}$ | $4.6 \times 10^{-3}$ | 19 | 19 | 18 |
| Example 25 | 99.9% Fe | 40/60 | 20 | 0.2 | No change | $6.7 \times 10^{-3}$ | $5.5 \times 10^{-3}$ | 20 | 20 | 20 |
| Example 26 | SUS 429 | 35/65 | 20 | 0.2 | No change | $6.5 \times 10^{-3}$ | $4.7 \times 10^{-3}$ | 19 | 19 | 18 |
| Comparative Example 9 | SUS 430 | 65/35 | 20 | 0.2 | No change | $7.2 \times 10^{-3}$ | $6.2 \times 10^{-3}$ | 20 | 20 | 20 |

|  | Evaluation of optical memory disk | | | | |
|---|---|---|---|---|---|
|  | Loading test | Clamping force (g) | Bonding strength of hub (kg) | Bit error rate | Notes (Evaluation result) |
| Example 22 | No change | 780 | 19 | $10^{-6}$ | Good |
| Example 23 | No change | 670 | 19 | $10^{-6}$ | Good |
| Example 24 | No change | 960 | 19 | $10^{-6}$ | Good |

TABLE 6-continued

|  |  |  |  |  |  |
|---|---|---|---|---|---|
| Example 25 | No change | 800 | 19 | $10^{-6}$ | Good |
| Example 26 | No change | 770 | 19 | $10^{-6}$ | Good |
| Comparative Example 9 | — | 350 | 20 | — | Clamping force being inadequate |

EXAMPLE 27

A polytubylene terephthalate powder having an average particle size of 0.2 mm and an intrinsic viscosity of 0.85 as measured in a 50/50 solution of phenol and tetrachloroethane, a low density polyethylene powder having an average particle size of 0.5 mm, a polytetrafluoroethylene powder having an average particle size of 0.3 mm, SUS 430 fiber having an average fiber diameter of 0.03 mm and an average fiber length of 2 mm and SUS 430 powder having an average particle size of 0.05 mm, were mixed in the proportions as identified in Table 7. Further, based on the amount of the resin component, 0.3% by weight of carbon black as a coloring agent, 0.2% by weight of an antioxidant (B-220, manufactured by Ciba-Gaigy Company) and 0.2% by weight of a releasing agent (OP-WAX, manufactured by Hoechst Company) were added thereto. The mixture was stirred and mixed in a V-type tumbler for 30 minutes at 30 rpm and then extruded by a vent-type extruder having a darmageequipped screw having a diameter of 45 mm. The strand thereby obtained was cut to obtain pellets of a magnetic material-incorporated thermoplastic resin.

The pellets thus obtained were injection molded by an injection molding machine having an injection capacity of 1 ounce provided with a single-cavity mold with a three point pin gate and having a solenoid coil disposed in a movable plate so that lines of magnetic induction traverse the mold cavity, at a cylinder temperature of 260° C. at a mold temperature of 60° C. under an injection maximum pressure of 500 kg/cm² at a molding cycle of 22 seconds to obtain a hub having a disk shape with an outer diameter of 25.00 mm and a thickness of 2.15 mm and provided at the center with a hole having a diameter of 4,008 mm.

One second after the injection, a load of 24 V and 1 A was applied to the solenoid coil to let a magnetic field form, and 14 seconds after the injection, the application was switched off.

The hub thereby obtained was bonded by means of an epoxy type adhesive to a separately molded groove-recorded polycarbonate disk substrate having an diameter of 130 mm, an inner diameter of 15 mm and a thickness of 1.2 mm and with a cyanine dye recording material coated thereon. Then, two sheets of this hub-attached disk substrate were bonded to each other by an adhesive with the recording surfaces located inside and with thin polycarbonate plates having a thickness of 0.6 mm interposed along the outermost periphery and the innermost periphery, to obtain an optical memory disk having a sandwich structure. The results of evaluation of the optical memory disk thus obtained are shown in Table 7.

EXAMPLES 28 TO 31 AND COMPARATIVE EXAMPLES 10 AND 11

The experiments were conducted in the same manner as in Example 27 except that the mixing proportions (weight of the components constituting the hub were changed as shown in Table 7. The results are shown in Table 7.

TABLE 7

| | Composition (weight %) | | | | | Evaluation of hub | | | |
|---|---|---|---|---|---|---|---|---|---|
| | Polybutylene terephthalate | Polyethylene | Polytetra-fluoroethylene | Magnetic fiber | Magnetic powder | Salt water spray test | Environmental resistance test | Dimensional change (%/°C.) | |
| | | | | | | | | Radial direction | Thickness direction |
| Example 27 | 21 | 4 | — | 35 | 40 | No change | No change | $6.3 \times 10^{-3}$ | $4.9 \times 10^{-3}$ |
| Example 28 | 21 | — | 4 | 35 | 40 | No change | No change | $6.2 \times 10^{-3}$ | $5.0 \times 10^{-3}$ |
| Example 29 | 21 | 1 | 3 | 35 | 40 | No change | No change | $6.2 \times 10^{-3}$ | $5.0 \times 10^{-3}$ |
| Example 30 | 22 | 1 | 2 | 45 | 30 | No change | No change | $6.5 \times 10^{-3}$ | $4.7 \times 10^{-3}$ |
| Example 31 | 35 | 2 | 3 | 60 | — | No change | No change | $6.7 \times 10^{-3}$ | $5.3 \times 10^{-3}$ |
| Comparative Example 10 | 53 | 3 | 4 | — | 40 | No change | No change | $6.8 \times 10^{-3}$ | $6.9 \times 10^{-3}$ |
| Comparative Example 11 | 5.5 | — | 0.5 | — | 94 | — | — | — | — |

| | Evaluation of optical memory disk | | | | | | | |
|---|---|---|---|---|---|---|---|---|
| | Birefringence (double pass, nm) | | Loading test* | | | | | |
| | Blank | After attaching the hub | After thermal cycle test | Appearance | Dimensional change in inner diameter (mm) | Clamping force (g) | Bonding strength of hub (kg) | Bit error rate4 | Notes (Evaluation result) |
| Example 27 | 20 | 20 | 21 | No change | 0.003 | 850 | 19 | $10^{-6}$ | Good |
| Example 28 | 20 | 20 | 20 | No change | 0.003 | 860 | 19 | $10^{-6}$ | Good |
| Example 29 | 20 | 20 | 21 | No change | 0.002 | 860 | 18 | $10^{-6}$ | Good |
| Example 30 | 20 | 20 | 20 | No change | 0.002 | 800 | 18 | $10^{-6}$ | Good |
| Comparative Example 10 | 20 | 20 | 20 | No change | 0.002 | 390 | 18 | $10^{-6}$ | Clamping force |

TABLE 7-continued

| | | | | | | | | | |
|---|---|---|---|---|---|---|---|---|---|
| Comparative Example 11 | — | — | — | — | — | — | — | — | being inadequate Poor moldability, No molded product obtained |

*Loading test: Loading to a record reproduction drive apparatus was repeated 20,000 times, whereupon the appearance was inspected and the dimensional change was observed.

EXAMPLE 32

A mixture comprising 90% by weight of a polybutylene terephthalate, 5% by weight of a low density polyethylene and 5% by weight of polytetrafluoroethylene, was mixed in a double cone type tumbler having an internal capacity of 50 l, and then extruded by a 4.5 mm vent-type single screw extruder into a strand, which was then cut to obtain a composition in the form of pellets. This composition was molded by a 0.5 ounce injection molding machine by means of a four-cavity mold with side gates to obtain ring-shaped molded products having an inner diameter of 4.008 mm, an outer diameter of 7.0 mm and a thickness of 2.17 mm.

Each ring-shaped molded product thus obtained was inserted in a two-cavity mold, and a polybutylene terephthalate containing 40% by weight of SUS 430 fiber and 40% by weight of SUS 430 powder, was injection molded to obtain optical memory disk hub having an outer diameter of 24.95 mm and a thickness of 2.17 mm and having the ring-shaped molded product inserted along the inner circumference.

The hub thus obtained was bonded by means of an epoxy type adhesive to a separately molded and groove-recorded polycarbonate disk substrate having an outer diameter of 130 mm, an inner diameter of 15 mm and a thickness of 1.2 mm and having a cyanine dye recording material coated thereon. Two sheets of this hub-attached disk substrate were bonded to each other by an adhesive with the recording surfaces located inside and with thin polycarbonate plates having a thickness of 0.6 mm interposed along the outermost periphery and the innermost periphery to obtain an optical memory disk having a sandwich structure. The results are evaluation are shown in Table 8.

EXAMPLES 33 TO 36 AND COMPARATIVE EXAMPLES 12 AND 13

The experiments were conducted in the same manner as in Example 32 except that the proportions of the components constituting the mixture for the inner circumferential part of the hub were changed as shown in Table 8. The results are shown in Table 8.

TABLE 8

| | Composition of inner circumferential part (weight %) | | | | | Environmental resistance test of hub | | Loading test of optical memory disk* | |
|---|---|---|---|---|---|---|---|---|---|
| | Polybutylene-terephthalate | Nylon 12 | Polyacetal | Low density polyethylene | Polytetrafluoroethylene | Appearance | Dimensional change in inner diameter (mm) | Appearance | Dimensional change in inner diameter (mm) |
| Example 32 | 90 | — | — | 5 | 5 | No change | +0.004 | No change | +0.003 |
| Example 33 | 90 | — | — | — | 10 | No change | +0.003 | No change | +0.002 |
| Example 34 | 70 | — | — | 10 | 20 | No change | +0.003 | No change | +0.006 |
| Example 35 | — | 90 | — | 5 | 5 | No change | +0.007 | No change | +0.003 |
| Example 36 | — | — | 90 | 5 | 5 | No change | +0.004 | No change | +0.003 |
| Comparative Example 12 | 50 | — | — | 5 | 40 | Surface roughened | +0.002 | Abraded powder formed at the center hole | +0.02 |
| Comparative Example 13 | 50 | — | — | 40 | 5 | No change | +0.005 | No change | +0.012 |

*Loading test: Loading to a record reproduction drive apparatus was repeated 20,000 times, whereupon the appearance was inspected and the dimensional change in the inner diameter was observed.

Referring to FIG. 1 showing the cross sectional view of a mold for injection molding used in the present invention, reference numeral 11 indicates a fixed mold, numeral 12 indicates a movable mold, numeral 13 indicates a solenoid coil, numeral 14 indicates wiring, numeral 15 indicates a gate and numeral 16 indicates a mold cavity.

Referring to FIGS. 2 to 6, reference numeral 1 indicates an inner circumferential part of the optical memory disk hub of the present invention, and numeral 2 indicates an outer circumferential part thereof.

We claim:

1. An optical memory disk hub made essentially of from 7 to 55% by weight of a thermoplastic resin and from 45 to 93% by weight of at least one of a magnetic powder and a magnetic fiber, wherein the at least one of the magnetic powder and the magnetic fiber are oriented in a thickness direction of the optical memory disk hub.

2. The optical memory disk hub according to claim 1, which is made essentially of from 7 to 55% by weight of a thermoplastic resin, from 1 to 60% by weight of the magentic fiber and from 1 to 92% by weight of magnetic powder, the total being 100% by weight.

3. The optical memory disk hub according to claim 1, which is made essentially of from 7 to 55% by weight of a thermoplastic resin other than a polyolefin resin and a fluorine resin and from 45 to 93% by weight of the at least one of the magnetic powder and magnetic fiber, and from 0.5 to 20% by weight, relative to the thermoplastic resin, of at least one of a polyolefin resin and/or a fluorine resin.

4. The optical memory disk hub according to claim 1 which consists essentially of an inner circumferential part and an outer circumferential part surrounding the inner circumferential part, wherein the inner circumferential part defining the center hole of the hub is made of from 60 to 99% by weight of at least one member selected from the group consisting of a polyester resin, a polyamide resin, a polyacetal resin and from 40 to 1% by weight of at least one member selected from the group consisting of a polyolefin resin and a fluorine resin, and the outer circumferential part is made of from 7 to 55% by weight of a thermoplastic resin and from 45 to 93% by weight of the at least one of the magnetic powder and magnetic fiber.

5. The optical memory disk hub according to claim 1, which consists essentially of an inner circumferential part and an outer circumferential part surrounding the inner circumferential part, wherein the inner circumferential part is made of from 7 to 55% by weight of a thermoplastic resin and from 45 to 93% by weight of the at least one of the magnetic powder and magnetic fiber, and the outer circumferential part is made of a transparent resin.

6. The optical memory disk hub according to claim 1, wherein the magnetic powder and the magnetic fiber are made of a ferrite-type stainless steel.

7. The optical memory disk hub according to claim 1, wherein the magnetic fiber has an average fiber diameter of from 0.002 to 0.2 mm and an average fiber length of at most 10 mm.

8. The optical memory disk hub according to claim 1, wherein the magnetic powder has a weight average particle size of from 0.001 to 0.3 mm.

9. The optical memory disk hub according to claim 1, wherein the magnetic powder has a weight average particle size of 5 to 150 μm.

10. The optical memory disk hub according to claim 1, wherein the magnetic fiber has an average fiber diameter of from 0.005 to 0.15 mm and an average fiber length of at most 10 mm.

11. The optical memory disk hub according to claim 1, wherein said hub has a linear coefficient of expansion in a radial direction substantially the same as a linear coefficient of expansion of said memory disk.

12. The optical memory disk hub according to claim 1, wherein said polyester resin is selected from the group consisting of polyethelene terephthalate, polybutylene terephthalate and copolymers containing at least 50% by weight thereof.

13. The optical memory disk hub according to claim 1, wherein the thermoplastic resin is a polyester resin.

14. An optical memory disk hub for attachment to an optical memory disk, comprising:
a ring member made essentially of from 7 to 55% by weight of a thermoplastic resin; and
means, including at least one of a magnetic powder and a magnetic fiber, for matching a radial coefficient of linear expansion of said ring member with a coefficient of linear expansion of said optical memory disk.

15. The optical memory disk hub according to claim 14, wherein said means for matching comprises said at least one of said magnetic powder and said magnetic fiber oriented in a direction perpendicular to a radial direction of said hub.

16. The optical memory disk hub according to claim 14, wherein said hub is essentially made of from 1 to 60% by weight of said magnetic fiber and from 1 to 92% by weight of said magnetic powder.

17. The optical memory disk hub according to claim 14, wherein said ring member is made essentially of from 7 to 55% by weight of a thermoplastic resin other than a polyolefin resin and a fluorine resin, and from 45 to 93% by weight of at least one of said magnetic powder and said magnetic fiber, and from 0.5 to 20% by weight, relative to the thermoplastic resin, of at least one of a polyolefin resin and a fluorine resin.

18. The optical memory disk hub according to claim 14, wherein said ring member consists essentially of an inner circumferential part and an outer circumferential part surrounding the inner circumferential part, the inner circumferential part being made of from 7 to 55% by weight of a thermoplastic resin and from 45 to 93% by weight of magnetic powder and/or magnetic fiber, and the outer circumferential part being made of a transparent resin.

19. An optical memory disk hub for attachment to an optical memory disk, comprising:
a ring member made essentially of from 7 to 55% by weight of a thermoplastic resin; and
means, including at least one of a magnetic powder and a magnetic fiber, for matching a radial coefficient of linear expansion of said ring member with a coefficient of linear expansion of said optical memory disk;
wherein said ring member consists essentially of an inner circumferential part and an outer circumferential part surrounding the inner circumferential part, the inner circumferential part defining the center hole of the hub being made of from 60 to 99% by weight of at least one member selected from the group consisting of a polyester resin, a polyamide resin, a polyacetal resin and from 40 to 1% by weight of at least one member selected from the group consisting of a polyolefin and a fluorine resin, and the outer circumferential part being made of from 7 to 55% by weight of a thermoplastic resin and from 45 to 93% by weight of magnetic powder and/or magnetic fiber.

* * * * *